(12) United States Patent
Kim

(10) Patent No.: US 10,707,540 B2
(45) Date of Patent: Jul. 7, 2020

(54) BATTERY PACK

(71) Applicant: Samsung SDI Co., Ltd., Yongin-si, Gyeonggi-do (KR)

(72) Inventor: Hyungshin Kim, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 311 days.

(21) Appl. No.: 15/135,283

(22) Filed: Apr. 21, 2016

(65) Prior Publication Data

US 2016/0329610 A1    Nov. 10, 2016

(30) Foreign Application Priority Data

May 6, 2015 (KR) .................. 10-2015-0063216

(51) Int. Cl.
*H01M 10/42* (2006.01)
*H01M 2/06* (2006.01)
*H01M 2/04* (2006.01)

(52) U.S. Cl.
CPC ..... *H01M 10/4257* (2013.01); *H01M 2/0404* (2013.01); *H01M 2/06* (2013.01); *H01M 2220/30* (2013.01)

(58) Field of Classification Search
CPC combination set(s) only.
See application file for complete search history.

(56) References Cited

U.S. PATENT DOCUMENTS

| 7,858,228 | B2 | 12/2010 | Yoon |
| 8,236,435 | B2 * | 8/2012 | Jang .................... H01M 2/0404 361/809 |
| 8,592,066 | B2 | 11/2013 | Baek |
| 8,597,807 | B2 | 12/2013 | Lee et al. |
| 9,070,911 | B2 | 6/2015 | Jeong et al. |
| 2007/0202396 | A1 | 8/2007 | Jung |
| 2009/0246611 | A1 | 10/2009 | Kim |
| 2010/0124674 | A1 * | 5/2010 | Kwag ................. H01M 2/0207 429/7 |
| 2011/0039133 | A1 * | 2/2011 | Lee .................... H01M 2/0404 429/7 |
| 2011/0086243 | A1 * | 4/2011 | Bae .................... H01M 2/1022 429/7 |
| 2011/0183160 | A1 * | 7/2011 | Baek .................. H01M 2/0404 429/7 |

(Continued)

FOREIGN PATENT DOCUMENTS

| CN | 1953265 A | 4/2007 |
| CN | 101540380 A | 9/2009 |

(Continued)

OTHER PUBLICATIONS

Chinese Office Action, with English translation, dated Jan. 19, 2020, for corresponding Chinese Patent Application No. 201610286110.8 (25 pages).

*Primary Examiner* — Amanda J Barrow
(74) *Attorney, Agent, or Firm* — Lewis Roca Rothgerber Christie LLP

(57) ABSTRACT

A battery packing includes: a bare cell; a protective circuit module electrically connected to the bare cell; a first lead plate connecting the protective circuit module and a terminal of the bare cell; and a first cover at an upper portion of the bare cell, wherein a portion of the first cover protrudes outward and accommodates the protective circuit module.

11 Claims, 4 Drawing Sheets

(56) References Cited

U.S. PATENT DOCUMENTS

| | | |
|---|---|---|
| 2012/0129011 A1 | 5/2012 | Park |
| 2013/0115481 A1 | 5/2013 | Kim |
| 2014/0120379 A1* | 5/2014 | Baek .................. H01M 2/0202 |
| | | 429/7 |
| 2014/0315071 A1* | 10/2014 | Tsutsumi ............... H01G 11/78 |
| | | 429/156 |
| 2014/0349163 A1 | 11/2014 | Kim |
| 2015/0004441 A1* | 1/2015 | Jeong ..................... H01M 2/30 |
| | | 429/7 |

FOREIGN PATENT DOCUMENTS

| | | |
|---|---|---|
| CN | 101997132 A | 3/2011 |
| CN | 102136572 A | 7/2011 |
| CN | 103797617 A | 5/2014 |
| CN | 103811693 A | 5/2014 |
| CN | 203812955 U | 9/2014 |
| JP | 2011-170975 A | 9/2011 |
| KR | 10-2007-0089420 A | 8/2007 |
| KR | 10-2009-0103427 A | 10/2009 |
| KR | 10-2013-0051399 A | 5/2013 |
| KR | 10-2014-0137648 A | 12/2014 |

* cited by examiner

BATTERY PACK

CROSS-REFERENCE TO RELATED APPLICATION

This application claims priority to and the benefit of Korean Patent Application No. 10-2015-0063216, filed on May 6, 2015, in the Korean Intellectual Property Office, the disclosure of which is incorporated herein in its entirety by reference.

BACKGROUND

1. Field

One or more exemplary embodiments of the present invention relate to a battery pack.

2. Description of the Related Art

As wireless Internet or communication technology has been developed, portable electronic devices that can be operated using batteries without an external power supply have been widely used. Portable computers from among the portable electronic devices have relatively small sizes, may be carried, and allow for mobility and thus are widely used for business or personal purposes. These portable computers may include battery packs so that they may be used in several places without using an external power supply. A battery pack may include a bare cell that can be repeatedly charged/discharged so as to provide sufficient output.

SUMMARY

One or more exemplary embodiments of the present invention include a battery pack.

Additional aspects are set forth in part in the description which follows and, in part, will be apparent from the description, or may be learned by practice of the presented embodiments.

According to one or more exemplary embodiments of the present invention, a battery pack includes: a bare cell; a protective circuit module electrically connected to the bare cell; a first lead plate connecting the protective circuit module and a terminal of the bare cell; and a first cover at an upper portion of the bare cell, wherein a portion of the first cover protrudes outward and accommodates the protective circuit module.

The first cover may include: a first cover body part at an upper portion of the bare cell; and a first protrusion part, which protrudes from the first cover body part, wherein the protective circuit module is accommodated in the first protrusion part.

The first protrusion part may have an opening which at least partially exposes an external terminal of the protective circuit module.

The battery pack may further include a cover holder between the bare cell and the protective circuit module.

The protective circuit module may be offset from the terminal of the bare cell.

The protective circuit module may be farther away from the terminal of the bare cell than the first lead plate.

The battery pack may further include a label surrounding the bare cell.

The label may include: a first label surrounding the bare cell and a portion of the first cover; and a second label protruding from the first label and surrounding the protruding portion of the first cover.

According to one or more exemplary embodiments of the present invention, a battery pack includes: a bare cell; a protective circuit module electrically connected to the bare cell; a first lead plate connecting the protective circuit module and a terminal of the bare cell; and a first cover at an upper portion of the bare cell, wherein the bare cell includes: a can; a cap plate at an upper side of the can and welded to the can; and a bead protrusion prevention part on the cap plate and configured to prevent weld beads from protruding from the cap plate.

The bead protrusion prevention part may include a bead accommodation groove at at least one end of the cap plate.

The bead accommodation groove may be formed by rolling.

A portion of the first cover may protrude outward and the protective circuit module may be accommodated in the first cover.

The protective circuit module may be offset from the terminal of the bare cell.

BRIEF DESCRIPTION OF THE DRAWINGS

These and/or other aspects will become apparent and more readily appreciated from the following description of exemplary embodiments of the present invention, taken in conjunction with the accompanying drawings in which.

DETAILED DESCRIPTION

Figure 1:
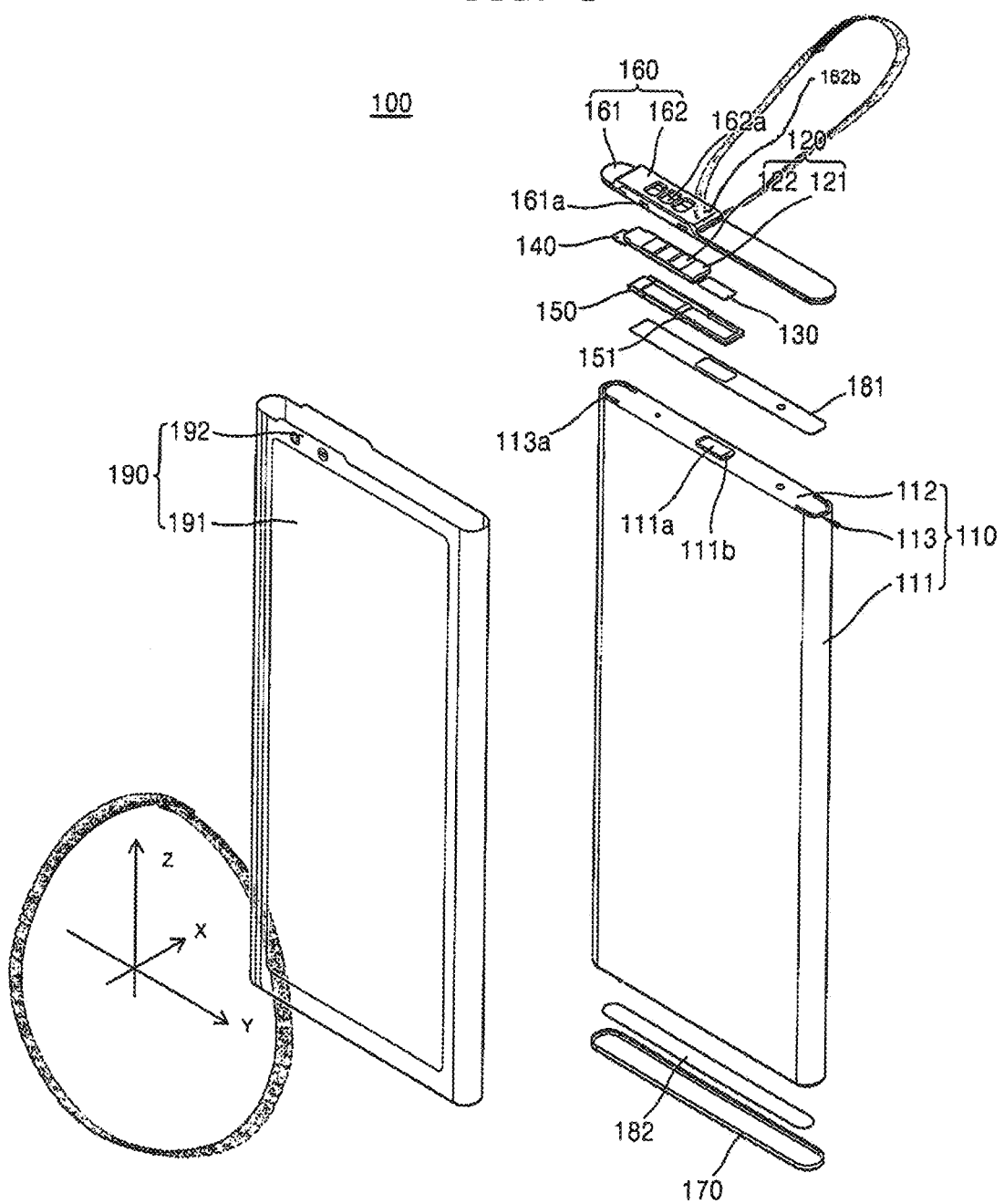
FIG. 1 is an exploded perspective view of a battery pack according to one or more exemplary embodiments of the present invention.

Reference is now made in detail to exemplary embodiments of the present invention, examples of which are illustrated in the accompanying drawings, wherein like reference numerals refer to like elements throughout. In this regard, the present exemplary embodiments may have different forms and should not be construed as being limited to the descriptions set forth herein. Accordingly, the exemplary embodiments are merely described below, by referring to the figures, to explain aspects of the present invention. In the drawings, the relative sizes of elements, layers, and regions may be exaggerated for clarity.

As used herein, the singular forms "a," "an" and "the" are intended to include the plural forms as well, unless the singular forms are not specifically mentioned in the paragraph. it will be further understood that the terms "comprises," "comprising," "includes" and/or "including" used herein specify the presence of stated components, steps, operations and/or elements but do not preclude the presence or addition of one or more other components, steps, operations and/or elements. It will be understood that although the terms "first", "second", etc. may be used herein to describe various components, these components should not be limited by these terms. These components are only used to distinguish one component from another. As used herein, the term "and/or" includes any and all combinations of one or more of the associated listed items. Expressions such as "at least one of," when preceding a list of elements, modify the entire list of elements and do not modify the individual elements of the list.

Spatially relative terms, such as "beneath," "below," "lower," "under," "above," "upper," and the like, may be used herein for ease of explanation to describe one element or feature's relationship to another element(s) or feature(s) as illustrated in the figures. It will be understood that the spatially relative terms are intended to encompass different orientations of the device in use or in operation, in addition to the orientation depicted in the figures. For example, if the device in the figures is turned over, elements described as "below" or "beneath" or "under" other elements or features would then be oriented "above" the other elements or features. Thus, the example terms "below" and "under" can encompass both an orientation of above and below. The device may be otherwise oriented (e.g., rotated 90 degrees or at other orientations) and the spatially relative descriptors used herein should be interpreted accordingly.

It will be understood that when an element or layer is referred to as being "on," "connected to," or "coupled to" another element or layer, it can be directly on, connected to, or coupled to the other element or layer, or one or more intervening elements or layers may be present. In addition, it will also be understood that when an element or layer is referred to as being "between" two elements or layers, it can be the only element or layer between the two elements or layers, or one or more intervening elements or layers may also be present.

As used herein, the term "substantially," "about," and similar terms are used as terms of approximation and not as terms of degree, and are intended to account for the inherent deviations in measured or calculated values that would be recognized by those of ordinary skill in the art. Further, the use of "may" when describing embodiments of the present invention refers to "one or more embodiments of the present invention." As used herein, the terms "use," "using," and "used" may be considered synonymous with the terms "utilize," "utilizing," and "utilized," respectively. Also, the term "exemplary" is intended to refer to an example or illustration.

The electronic or electric devices and/or any other relevant devices or components according to embodiments of the present invention described herein may be implemented utilizing any suitable hardware, firmware (e.g. an application-specific integrated circuit), software, or a combination of software, firmware, and hardware. For example, the various components of these devices may be formed on one integrated circuit (IC) chip or on separate IC chips. Further, the various components of these devices may be implemented on a flexible printed circuit film, a tape carrier package (TCP), a printed circuit board (PCB), or formed on one substrate. Further, the various components of these devices may be a process or thread, running on one or more processors, in one or more computing devices, executing computer program instructions and interacting with other system components for performing the various functionalities described herein. The computer program instructions are stored in a memory which may be implemented in a computing device using a standard memory device, such as, for example, a random access memory (RAM). The computer program instructions may also be stored in other non-transitory computer readable media such as, for example, a CD-ROM, flash drive, or the like. Also, a person of skill in the art should recognize that the functionality of various computing devices may be combined or integrated into a single computing device, or the functionality of a particular computing device may be distributed across one or more other computing devices without departing from the spirit and scope of the exemplary embodiments of the present invention.

Unless otherwise defined, all terms (including technical and scientific terms) used herein have the same meaning as commonly understood by one of ordinary skill in the art to which the present invention belongs. It will be further understood that terms, such as those defined in commonly used dictionaries, should be interpreted as having a meaning that is consistent with their meaning in the context of the relevant art and/or the present specification, and should not be interpreted in an idealized or overly formal sense, unless expressly so defined herein.

Figure 2:
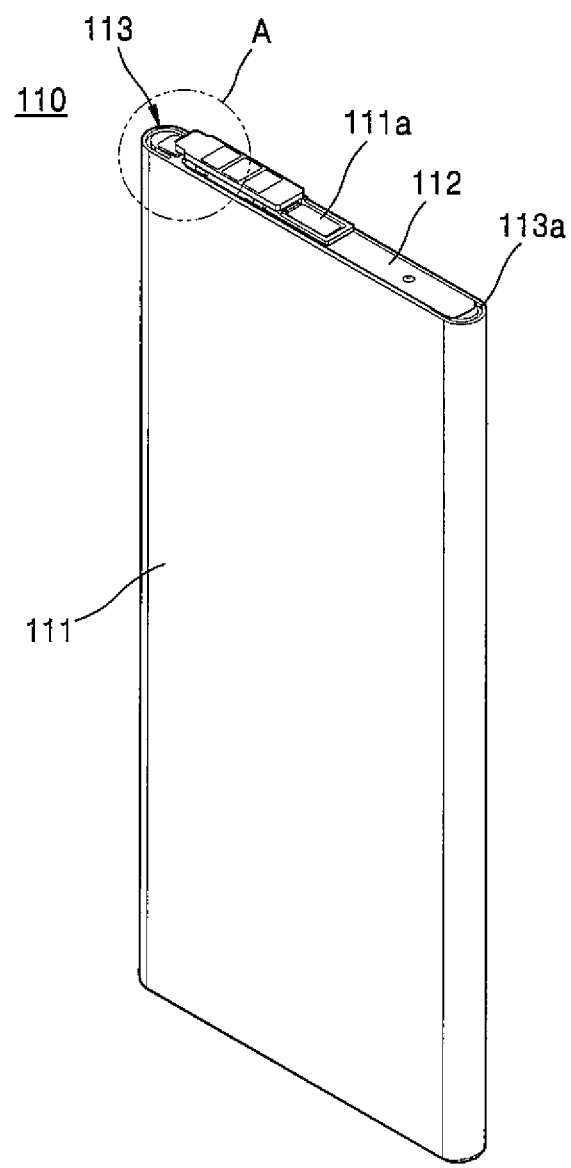
FIG. 2 is a perspective view of a bare cell of FIG. 1.
Figure 3:
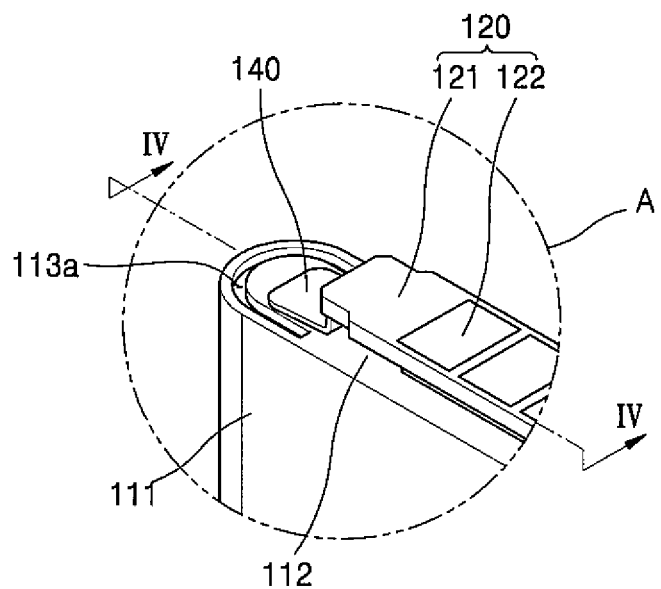
FIG. 3 is an enlarged view of the portion A of FIG. 2.
Figure 4:
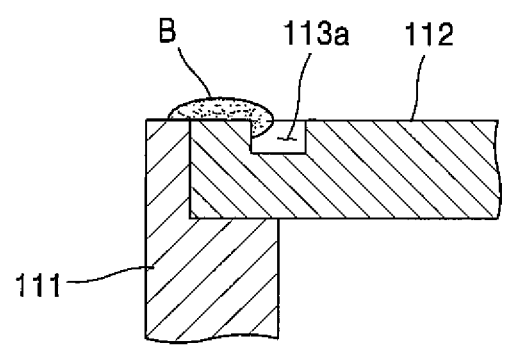
FIG. 4 is a cross-sectional view taken along the line IV-IV of FIG. 3.

FIG. 1 is an exploded perspective view of a battery pack according to one or more exemplary embodiments of the present invention. FIG. 2 is a perspective view of a bare cell of FIG. 1. FIG. 3 is an enlarged view of the portion A of FIG. 2. FIG. 4 is a cross-sectional view taken along the line IV-IV of FIG. 3.

Referring to FIGS. 1 through 4, a battery pack 100 according to one or more embodiments of the present invention may include a bare cell 110, a protective circuit module 120, a first lead plate 130, a second lead plate 140, a cover holder 150, a first cover 160, a second cover 170, a first tape 181, a second tape 182, and a label 190.

The bare cell 110 may include a can 111, an electrode assembly, a cap plate 112, and a bead protrusion prevention part 113. A space may be formed in the can 111, and the electrode assembly may be disposed in the can 111 to be combined with an electrolyte. The electrode assembly may include a negative electrode plate onto which a negative electrode active material is coated, a positive electrode plate onto which a positive electrode active material is coated, and a separator interposed therebetween. In one or more embodiments, the positive electrode plate, the negative electrode plate, and the separator may be wound in a jelly roll shape and may form the electrode assembly.

The cap plate 112 may be installed in an opened portion (or side) of the can 111 and may be fixed to the can 111. In one or more embodiments, the cap plate 112 may be fixed to the can 111 using welding. Hereinafter, for convenience of explanation, the case where the cap plate 112 is fixed to the can 111 using laser welding is described.

The cap plate 112 may be formed of a metal material, and an opening (e.g., a hole) may be formed so that the electrolyte may be injected into the can 111 through the opening. In one or more embodiments, the opening may be sealed (e.g., by a stopper or a separate stopper). Also, the cap plate 112 may include a terminal 111a that is formed to protrude outward (e.g., away from the can 111) and contacts the first lead plate 130. For example, the terminal 111a may be disposed at or near the center of the cap plate 112 with respect to a lengthwise direction of the cap plate 112. Also, a gasket 111b may be disposed between the terminal 111a and the cap plate 112 and may insulate the terminal 111a and the cap plate 112 from each other.

The bead protrusion prevention part 113 may be formed in the cap plate 112. In one or more embodiments, the bead protrusion prevention part 113 may be formed in at least one end of the cap plate 112 (e.g., may be formed at one or both distal ends of the cap plate 112 (e.g., an end that is distal to the center of the cap plate 112)).

The bead protrusion prevention part 113 may be a bead accommodation groove 113a that is formed to be recessed from a top surface of the cap plate 112. For example, the bead protrusion prevention part 113 may be formed to have a shape that is the same as or similar to a lateral shape of the can 111 (e.g., the bead protrusion prevention part 113 may be formed to have a shape that is the same as or similar to a side portion of the can 111). The bead protrusion prevention part 113 may be disposed to be spaced apart from an edge of the cap plate 112 (e.g., spaced apart from an edge of the cap plate 112 by a predetermined distance).

The protective circuit module 120 may be electrically connected to the bare cell 110. In one or more embodiments, the protective circuit module 120 may be connected to the first lead plate 130 and the second lead plate 140 and may protect the bare cell 110 from overcharging, overdischarging, and/or high temperature.

In one or more embodiments, the protective circuit module 120 may be manufactured to be slim, with a relatively small width (along a width direction X) and a relatively large length (along a length direction Y), and may be disposed in an area that has bilateral symmetry with respect to the center of the bare cell 110. As such, a size of the protective circuit module 120 is reduced or minimized so that spatial utility of the battery pack 100 may be increased. For example, reducing the size of the protective circuit module 120 and reducing or minimizing the space required to accommodate the protective circuit module 120 may provide for an increase of the capacity of the bare cell 110.

The protective circuit module 120 may be disposed to be spaced apart from the top surface of the cap plate 112 and may include at least one of a safety element and a protective element that are separately installed on a circuit board 121. For example, the protective element may include a switch (e.g., a switching part) and a controller that are electrically connected to wire patterns formed in the circuit board 121 and form a charging/discharging current path. For example, the protective element may be formed as one chip or circuitry and may be mounted on the circuit board 121. The safety element, which is a secondary element, may perform a function of regulating a charging or discharging current and/or cutting off the charging or discharging current following a malfunction, such as overheating or overcurrent. For example, the safety element may include a positive temperature coefficient (PTC), a fuse, a current cutoff element, or a via metal.

The protective circuit module 120 may include an external terminal 122 formed on the circuit board 121. The external terminal 122 may be electrically connected to an external electronic device.

The protective circuit module 120 may be formed to have a length that is less than or equal to half of a length of the cap plate 112. For example, the protective circuit module 120 may be formed to have a length that is less than a distance from one of the ends of the terminal 111a to the corresponding end of the cap plate 112 (e.g., the protective circuit module 120 may be formed to have a length that is less than a distance from a distal end of the terminal 111a to a corresponding distal end of the cap plate 112, in other words, an end close to the edge of the cap plate 112). In this case, the circuit board 121 may be disposed to be offset from the terminal 111a. That is, the circuit board 121 may be disposed between one of the distal ends of the cap plate 112 and the terminal 111a. Also, the circuit board 121 may be disposed to be farther away from the terminal 111a than the first lead plate 130.

The first lead plate 130 and the second lead plate 140 may be connected to the protective circuit module 120. For example, the first lead plate 130 and the second lead plate 140 may each be formed to be bent (e.g., to include a bent portion) so that one surface of the protective circuit module 120 may be spaced apart from the cap plate 112. Also, the first lead plate 130 and the second lead plate 140 may be disposed such that the respective bent portions face each other so that each of one end of the first lead plate 130 and one end of the second lead plate 140 may be inserted into and fixed to the circuit board 121 (e.g., the bent portions of the first lead plate 130 and the second lead plate 140 may be inserted into and fixed to the circuit board 121).

The first lead plate 130 may connect the protective circuit module 120 and the terminal 111a. Also, the second lead plate 140 may connect the cap plate 112 and the protective circuit module 120.

In one or more embodiments, the cover holder 150 may be disposed between the protective circuit module 120 and the cap plate 112. For example, the cover holder 150 may insulate the protective circuit module 120 and the cap plate 112 from each other. The cover holder 150 may be manufactured of an insulating, injection-molded material.

The terminal 111a may be inserted into the cover holder 150 (e.g., the terminal 111a may be inserted into an opening or a hole in the cover holder 150). The first lead plate 130 may be inserted into the opening in the cover holder 150. As such, the terminal 111a may be exposed through the hole and may be connected to the first lead plate 130 that is inserted into the hole.

In one or more embodiments, the first cover 160 may be disposed on the cap plate 112 and the protective circuit module 120. For example, the first cover 160 may include a first cover body part 161 (e.g., a first cover body portion) and a first protrusion part 162 (e.g., a first protrusion portion).

The first cover body part 161 may be formed in a plate shape and may be disposed on the cap plate 112 in areas corresponding to areas of the cap plate 112 on which the protective circuit module 120 is not disposed. In this case, the first cover body part 161 may have the same or substantially the same area as that of the cap plate 112. For example, the perimeter of the first cover body part 161 may be substantially the same as the perimeter of the cap plate 112.

Figure 5:
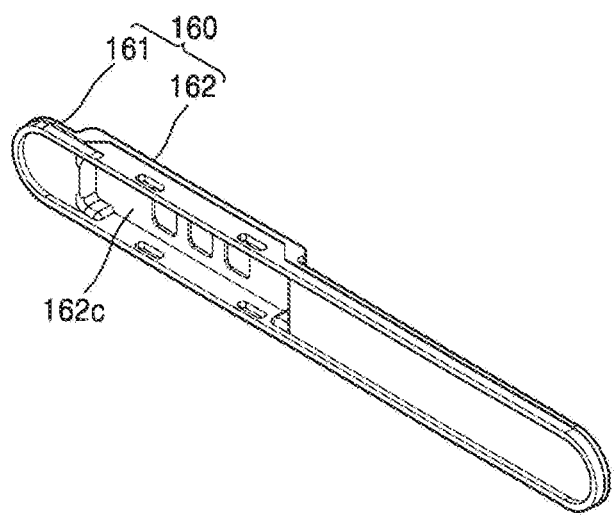
FIG. 5 is a perspective view illustrating an inner surface of a first protrusion part of the battery pack of FIG. 1.

The first protrusion part 162 may be connected to the first cover body part 161 and may be formed to protrude from the first cover body part 161 in a direction opposite to a direction of the bare cell 110 (e.g., an outer surface 162b of the first protrusion part 162 may protrude away from the bare cell 110 in a height direction Z). Referring to FIG. 5, a space may be formed in the first protrusion part 162 so that the protective circuit module 120 in its entirety may be inserted or accommodated in the space (e.g., an inner surface 162c of the first protrusion part 162 opposite to the outer surface 162b of the first protrusion part may have a concave shape defining the space). The inner surface 162c may face the protective circuit module 140. The inner surface 162c of the first protrusion part 162 may define a space that accommodates the protective circuit module 140 in its entirety. Also, an exposure opening (or exposure hole) 162a through which the external terminal 122 may be exposed to the outside may be formed in the first protrusion part 162. In one or more exemplary embodiments, a separate terminal to be connected to the external terminal 122 may also be formed in the first protrusion part 162. Hereinafter, for convenience of explanation, the case where the exposure opening 162a is formed in the first protrusion part 162, is described.

The first protrusion part 162 may be formed to be eccentric (e.g., offset or skewed or to one side) from the center of the first cover body part 161 with respect to a lengthwise direction of the first cover body part 161 (e.g., the length direction Y). For example, the first protrusion part 162 may be formed in a position corresponding to the protective circuit module 120. Thus, the first protrusion part 162 may be formed between the terminal 111a and one of the ends of the cap plate 112. It will be appreciated that a distance between the cap plate 112 and a portion of the first cover body part 161 that covers the terminal 111a along the height direction Z is less than a distance between an uppermost portion of the first protrusion part 162 and the cap plate 112 along the height direction Z.

The first tape 181 may be disposed between the cover holder 150 and the cap plate 112 and between the first cover 160 and the cap plate 112. For example, the first tape 181 may be formed of an adhesive material to attach the cover holder 150 onto the cap plate 112 and to attach the first cover 160 onto the cap plate 112.

One of the cover holder 150 and the first cover 160 may include a coupling part (or coupling portion) 151, and the other one of the cover holder 150 and the first cover 160 may include a fixed part (or fixed portion) 161a. For example, the coupling part 151 may be formed as a protrusion or a hook, and the fixed part 161a may be formed as a hole or opening or groove into which the coupling part 151 is inserted. Hereinafter, for convenience of explanation, the case where the coupling part 151 is disposed in the cover holder 150 and the fixed part 161a is disposed in the first cover 160 is described.

The second cover 170 may be installed on a bottom surface (or lower surface) of the can 111. In one or more embodiments, the second tape 182 may be formed of an adhesive material to attach the second cover 170 to the can 111 and to fix the second cover to the can 111.

The label 190 may be installed to surround a part of the first cover 160 and a part of the bare cell 110 and the second cover 170. In this case, the label 190 may include a first label 191 installed to surround a part of the first cover body part 161 and a part of the bare cell 110 and the second cover 170 and a second label 192 installed to surround a part of the first protrusion part 162.

In one or more embodiments, the first label 191 and the second label 192 may be integrally formed. For example, the second label 192 may be formed to protrude from the first label 191 toward the first protrusion part 162. As such, the second label 192 may be attached to sides of the first protrusion part 162.

According to a method of manufacturing the battery pack 100 according to one or more embodiments of the present invention, first, the bare cell 110 may be manufactured or obtained. In detail, after the can 111, the electrode assembly and the cap plate 112 are respectively manufactured (or obtained), the electrode assembly may be inserted into the can 111, and the cap plate 112 and the can 111 may be welded and fixed to the electrode assembly. In this case, a top side of the can 111 on which the cap plate 112 is seated may be formed to be stepped so that the cap plate 112 may be seated at the top side of the can 111.

When welding is performed, as described above, edges of the cap plate 112 may be welded. In this case, when welding is performed, one or more beads (e.g., welding beads) B caused by welding may be generated on both ends of the cap plate 112. These beads B may be formed on a top surface of the cap plate 112.

Because a general battery pack has a top surface of a cap plate that is flat or substantially flat, when the beads B are formed, the second lead plate 140 and the cap plate 112 may not smoothly contact each other. In detail, when the protective circuit module 120 is disposed to be eccentric toward one side of the cap plate 112, as described above, the second lead plate 140 may be adjacent to one of the ends of the cap plate 112 and may contact the cap plate 112. In this case, when the beads generated by welding are formed on the top surface of the cap plate 112, the top surface of the cap plate 112 that the second lead plate 140 contacts may be bent or uneven.

However, in the battery cell 100 according to one or more exemplary embodiments of the present invention, the bead accommodation groove 113a may be formed in the cap plate 112 so that the beads B may be prevented from being formed at a portion of the cap plate 112 that has the second lead plate 140 installed thereon. In addition, the bead accommodation groove 113a may be prevent or substantially prevent the beads B from protruding from the cap plate, for example, during or after welding the cap plate 112 and the can 111.

In detail, the bead accommodation groove 113a may be formed in at least one end of the cap plate 112, as described above. In this case, the bead accommodation groove 113a may be formed when the top surface of the cap plate 112 is recessed by rolling. As such, a bottom surface of the cap plate 112 corresponding to the portion of the cap plate 112 having the bead accommodation groove 113a may be formed so that only the top surface of the cap plate 112 may be recessed.

As described above, when the cap plate 112 includes the bead accommodation groove 113a, the beads B generated by welding may be accommodated (or inserted into and housed or stored) in the bead accommodation groove 113a. In particular, the bead accommodation groove 113a may be formed to surround a portion of the cap plate 112 that the second lead plate 140 contacts, thereby preventing the beads B from invading (or being formed at) the portion of the cap plate 112 that the second lead plate 140 contacts. Thus, the bead accommodation groove 113a may prevent the beads B from invading the portion of the cap plate 112 in which the second lead plate 140 is installed, so that the second lead plate 140 and the cap plate 112 may be in close contact (e.g., completely in close contact) with each other.

When welding of the can 111 and the cap plate 112 is finished, as described above, the first tape 181 may be attached to the cap plate 112. In this case, a length of the first tape 181 may be formed to have a length that is different from a length of the cap plate 112. For example, the length of the first tape 181 may be less than the length of the cap plate 112. For example, the portion of the cap plate 112 that the second lead plate 140 contacts may omit the first tape 181, so that a space in which the second lead plate 140 is fixed to the cap plate 112, may be secured (or substantially secured).

The cover holder 150 may be installed on the first tape 181. In this case, the cover holder 150 may be attached to the second tape 182. The protective circuit module 120 may be installed on the cover holder 150. In this case, the protective circuit module 120 may be in a state in which the first lead plate 130 and the second lead plate 140 are installed.

The first lead plate 130 may be coupled to the terminal 111a by welding. Also, the second lead plate 140 may be coupled to the cap plate 112 by welding. In this case, an outer edge of one end of the second lead plate 140 may be surrounded by the bead accommodation groove 113a, as described above.

The first cover 160 may be installed on the protective circuit module 120. In this case, the first cover 160 may also be installed to shield (e.g., completely shield) a top surface of the protective circuit module 120 and the top surface of the cap plate 112.

A part of the first cover 160 may be fixed to the cover holder 150, and the other part of the first cover 160 (e.g., the first cover body part 161) may be attached to and fixed to the first tape 181. In particular, the fixed part 161a formed in the first protrusion part 162 of the first cover 160 may be coupled to the coupling part 151 of the cover holder 150.

When the first cover 160 is installed, as described above, the first cover body part 161 of the first cover 160 (e.g., the portion excluding the first protrusion part 162) may be formed relatively flat. In this case, a height difference between the first protrusion part 162 and the first cover body part 161 of the first cover 160 occurs so that a space may be formed in the part of the first cover 160 excluding the first protrusion part 162. In particular, when the battery pack 100 is installed in an external device, a space is formed between the first cover body part 161 and the external device so that other components or parts required or used in the external device may be installed in the space.

While (or after or before) the first cover 160 is assembled, the second tape 182 may be installed at a lower portion of the bare cell 110 and then, the second cover 170 may be installed. Also, the label 190 may be installed on an outer surface of the bare cell 110.

In this case, the first label 191 may be installed to surround a part of the first cover body part 161 and a part of the bare cell 110 and the second cover 170, respectively. Also, the second label 192 may be attached to a part of sides of the first protrusion part 162.

Thus, the battery pack 100 may prevent or substantially prevent the beads B that are generated during welding from invading the top surface of the cap plate 112, thereby preventing a defective contact between the second lead plate 140 and the cap plate 112.

In the battery pack 100, the protective circuit module 120 is installed to be eccentric from the center of the bare cell 110 to prevent or minimize the likelihood of a short circuit that may occur when the protective circuit module 120 contacts the terminal 111a of the bare cell 110 by an external shock.

Also, in the battery pack 100, a space between the first cover 160 excluding the first protrusion part 162 and the external device is formed to secure a space in which other components of the external device may be disposed, when the external device is designed.

As described above, according to one or more of the embodiments of the present invention, a capacity of a battery may be increased or maximized, and a contact between a lead plate and a cap plate may be prevented from being disturbed by beads generated when welding is performed.

It should be understood that exemplary embodiments described herein should be considered in a descriptive sense only and not for purposes of limitation. Descriptions of features or aspects within each exemplary embodiment should typically be considered as available for other similar features or aspects in other exemplary embodiments.

While one or more exemplary embodiments have been described with reference to the figures, it will be understood by those of ordinary skill in the art that various changes in form and details may be made therein without departing from the spirit and scope as defined by the following claims, and their equivalents.

What is claimed is:

1. A battery pack comprising:
   a bare cell comprising a cap plate, the cap plate comprising a terminal;
   a protective circuit module electrically connected to the bare cell;
   a first lead plate connecting the protective circuit module and the terminal; and
   a first cover at an upper portion of the bare cell, the first cover comprising a first protrusion part comprising:
      an outer surface protruding away from the protective circuit module along a height direction; and
      an inner surface having a concave shape facing the protective circuit module, the inner surface being opposite to the outer surface, and the inner surface of the first protrusion part defining a space that accommodates the protective circuit module in its entirety,
   wherein the first protrusion part covers a portion of the protective circuit module along an entire width of the cap plate, and
   wherein the first protrusion part in its entirety is located between the terminal and an end of the cap plate along a length direction of the cap plate.

2. The battery pack of claim 1, wherein the first cover further comprises a first cover body part at the upper portion of the bare cell, the first protrusion part protruding from the first cover body part.

3. The battery pack of claim 2, wherein the first protrusion part has an opening which at least partially exposes an external terminal of the protective circuit module.

4. The battery pack of claim 1, further comprising a cover holder between the bare cell and the protective circuit module.

5. The battery pack of claim 1, wherein the protective circuit module is offset from the terminal.

6. The battery pack of claim 1, wherein the protective circuit module is farther away from the terminal than the first lead plate.

7. The battery pack of claim 1, further comprising a label surrounding the bare cell.

8. The battery pack of claim 7, wherein the label comprises:
   a first label surrounding the bare cell and a portion of the first cover; and
   a second label protruding from the first label and surrounding the first protrusion part.

9. The battery pack of claim 2,
   wherein the first protrusion part in its entirety is offset from a center of the first cover body part with respect to the length direction of the cap plate, the height direction and the length direction crossing each other.

10. The battery pack of claim 2, wherein a portion of the first cover body part covers the terminal, and
   wherein a distance between the cap plate and the portion of the first cover body part that covers the terminal along the height direction is less than a distance between an uppermost portion of the first protrusion part and the cap plate along the height direction, the height direction and the length direction crossing each other, and the height direction corresponding to a stacking direction of the cap plate and the first cover.

11. The battery pack of claim 1, wherein the first lead plate comprises a bent portion.

* * * * *